(12) United States Patent
Takizawa (10) Patent No.: US 9,803,980 B2
(45) Date of Patent: Oct. 31, 2017

(54) VIBRATING ELEMENT, ELECTRONIC APPARATUS, AND MOVING OBJECT

(71) Applicant: Seiko Epson Corporation, Tokyo (JP)

(72) Inventor: Teruo Takizawa, Matsumoto (JP)

(73) Assignee: Seiko Epson Corporation (JP)

( * ) Notice: Subject to any disclaimer, the term of this patent is extended or adjusted under 35 U.S.C. 154(b) by 326 days.

(21) Appl. No.: 14/662,540

(22) Filed: Mar. 19, 2015

(65) Prior Publication Data

US 2015/0268046 A1 Sep. 24, 2015

(30) Foreign Application Priority Data

Mar. 20, 2014 (JP) .................................. 2014-057669

(51) Int. Cl.
  *G01C 19/56* (2012.01)
  *G01C 19/5747* (2012.01)

(52) U.S. Cl.
  CPC ................................ *G01C 19/5747* (2013.01)

(58) Field of Classification Search
  CPC .......................... G01C 19/5747; G01C 19/5733
  USPC ....................................................... 73/504.12
  See application file for complete search history.

(56) References Cited

U.S. PATENT DOCUMENTS

| 7,250,112 | B2 | 7/2007 | Nasiri et al. |
| 2005/0081633 | A1 | 4/2005 | Nasiri et al. |
| 2005/0170656 | A1 | 8/2005 | Nasiri et al. |
| 2007/0214883 | A1 | 9/2007 | Durante et al. |
| 2008/0000296 | A1 | 1/2008 | Johnson |
| 2008/0236280 | A1 | 10/2008 | Johnson et al. |
| 2008/0276706 | A1 | 11/2008 | Hartmann et al. |
| 2010/0037690 | A1 | 2/2010 | Gunthner et al. |
| 2010/0139399 | A1 | 6/2010 | Geiger et al. |
| 2012/0060604 | A1 | 3/2012 | Neul et al. |
| 2012/0210789 | A1* | 8/2012 | Kanemoto ............. G01C 19/56 73/504.12 |
| 2014/0326070 | A1 | 11/2014 | Neul et al. |

FOREIGN PATENT DOCUMENTS

| JP | 07-218268 | 8/1995 |
| JP | 2007-509346 A | 4/2007 |
| JP | 2007-271611 A | 10/2007 |
| JP | 2008-008884 A | 1/2008 |
| JP | 2008-514968 A | 5/2008 |
| JP | 2009-529666 A | 8/2009 |
| JP | 2010-531447 A | 9/2010 |
| JP | 2011-504585 A | 2/2011 |

* cited by examiner

*Primary Examiner* — John Chapman, Jr.
(74) *Attorney, Agent, or Firm* — Harness, Dickey & Pierce, P.L.C.

(57) ABSTRACT

An oscillator has a first axis and a second axis as two axes perpendicular to each other and a third axis perpendicular to a plane containing the first axis and the second axis and includes a mass part including a support and a first displacement portion and a second displacement portion that are connected rotatably around the first axis to the support via beams and extend along the direction of the second axis. The first displacement portion is provided on one side of the mass part and the second displacement portion is provided on the other side of the mass part, and free ends of the first displacement portion and the second displacement portion face each other and are connected to each other via a connection portion.

16 Claims, 6 Drawing Sheets

VIBRATING ELEMENT, ELECTRONIC APPARATUS, AND MOVING OBJECT

CROSS-REFERENCE TO RELATED APPLICATIONS

This application claims priority to Japanese Patent Application No. 2014-057669 filed on Mar. 20, 2014. The entire disclosure of Japanese Patent Application No. 2014-057669 is hereby incorporated herein by reference.

BACKGROUND

1. Technical Field

The present invention relates to an oscillator, an electronic apparatus, and a moving object.

2. Related Art

An angular velocity sensor and an acceleration sensor using an oscillator have been used in a technology for autonomically controlling the attitude of a ship, an airplane, a rocket, and other moving objects. In recent years, the sensors are also used in vehicle body control in a vehicle, car position detection in a car navigation system, vibration controlled correction in a digital camera, a video camcorder, a mobile phone (what is called hand-shake correction), and other types of operation. As the performance of moving objects and electronic apparatus advances, improvement in sensitivity of the sensors is required. For example, there has been a known rotational speed sensor in which two oscillating units are movably suspended over a basic device and allowed to incline around a suspension piece, as described in FIG. 4 in JP-T-2008-514968. In the rotational speed sensor, a reader formed of the oscillating units and electrodes reads a capacitance change that occurs when the oscillating units are inclined around the suspension piece in response to a rotational speed applied to the oscillating units and determines the rotational speed.

The rotational speed sensor described in JP-T-2008-514968 has an exterior made of a material primarily containing silicon or any other element and formed, for example, by using a photolithography method and an etching method. When the shapes of the two displacement portions (oscillating units) differ from each other due, for example, to manufacturing errors at the time of exterior formation, the natural oscillation frequencies of the displacement portions undesirably differ from each other. When angular velocity or acceleration is applied to the oscillating units in this state, the angular velocity or acceleration could be detected with lowered precision because the amounts of displacement of the two displacement portions differ from each other and hence electrostatic capacitance created between one of the displacement portions and a fixed electrode differs from electrostatic capacitance created between the other displacement portion and the fixed electrode.

SUMMARY

An advantage of some aspects of the invention is to solve at least a part of the problems described above, and the invention can be implemented as the following aspects or application examples.

Application Example 1

An oscillator according to this application example has a first axis and a second axis as two axes perpendicular to each other and a third axis perpendicular to a plane containing the first axis and the second axis and includes a mass part including a support and a first displacement portion and a second displacement portion that are connected rotatably around the first axis to the support via a beam and extend along the direction of the second axis. The first displacement portion is provided on one side of the mass part and the second displacement portion is provided on the other side of the mass part, and free ends of the first displacement portion and the second displacement portion face each other and are connected to each other via a connection portion.

According to this application example, the oscillator allows, when a physical quantity, such as angular velocity and acceleration, acts on the mass part, determination of the physical quantity through detection of electrostatic capacitance created when the free ends of the first displacement portion and the second displacement portion are displaced around the beam in the direction of the third axis. Since the first displacement portion and the second displacement portion are so provided that one side of the first displacement portion and one side of the second displacement face each other and serve as free ends, and the free ends are connected to each other via the connection portion, the first displacement portion and the second displacement portion can be displaced in the direction of the third axis at substantially the same oscillation frequency even when there is a difference in natural oscillation frequency between the first displacement portion and the second displacement portion. As a result, electrostatic capacitance created in the first displacement portion and electrostatic capacitance created in the second displacement portion are substantially equal to each other, whereby the physical quantity acting on the oscillator is detected with improved precision. An oscillator that allows detection of a physical quantity with improved precision can therefore be provided.

Application Example 2

In the oscillator according to the application example described above, it is preferable that the mass part is formed of a first mass part and a second mass part, and that the first mass part and the second mass part are connected to each other via an elastic part that is displaceable in the direction of the first axis.

According to this application example, the oscillator including a pair of mass parts allows determination of angular velocity through detection of electrostatic capacitance created in each of the mass parts. Further, since the pair of mass parts include the elastic part displaceable in the direction of the first axis, and the elastic part causes the pair of mass parts to oscillate in opposite directions to allow the mass parts to readily receive external force resulting from angular velocity. An oscillator that allows detection of angular velocity with improved precision can therefore be provided.

Application Example 3

In the oscillator according to the application example described above, it is preferable that the connection portion is flexible in the direction of the second axis.

According to this application example, in the oscillator, since the first displacement portion and the second displacement portion are connected to each other via the connection portion, which is flexible in the direction of the second axis, the free ends of the first displacement portion and the second displacement portion can be displaced around the beam in the direction of the third axis, and the first displacement portion and the second displacement portion can be displaced at substantially the same oscillation frequency. As a result, electrostatic capacitance created in the first displacement portion and electrostatic capacitance created in the second displacement portion are substantially equal to each other, whereby a physical quantity acting on the oscillator is detected with improved precision. An oscillator that allows detection of a physical quantity with improved precision can therefore be provided.

Application Example 4

In the oscillator according to the application example described above, it is preferable that the connection portion has a plurality of connection points in at least one of the first displacement portion and the second displacement portion.

According to this application example, in the oscillator, the free ends of the first displacement portion and the second displacement portion are connected to each other via the connection portion having a plurality of connection points. As a result, the rigidity of the connection portion in the direction of the first axis increases, and the amount of bending of the free ends of the first displacement portion and the second displacement portion in the direction of the first axis can therefore be reduced, whereby a physical quantity acting on the oscillator is detected with improved precision. An oscillator that allows detection of a physical quantity with improved precision can therefore be provided.

Application Example 5

In the oscillator according to the application example described above, it is preferable that each of the free end of the first displacement portion and the free end of the second displacement portion is provided with a recess that is open in the direction of the second axis, and that the connection portion is connected to the recesses.

According to this application example, in the oscillator, to provide a space that allows the connection portion to be connected to the free end of the first displacement portion and the free end of the second displacement portion, a recess that opens in the direction of the second axis is provided at each of the free ends. The thus provided recesses can narrow the gap between the free end of the first displacement portion and the free end of the second displacement portion. In other words, since the total area of the first displacement portion and the second displacement portion can be increased, the amount of change in electrostatic capacitance that occurs when the free ends of the first displacement portion and the second displacement portion are displaced around the beam in the direction of the third axis can be increased. An oscillator that allows detection of a physical quantity with improved precision can therefore be provided.

Application Example 6

In the oscillator according to the application example described above, it is preferable that a variable portion that varies the natural oscillation frequency of at least one of the first displacement portion and the second displacement portion is provided in at least one of the support, the first displacement portion, and the second displacement portion, to which the beam is connected.

According to this application example, in the oscillator, the natural oscillation frequency of the first displacement portion and the natural oscillation frequency of the second displacement portion can be so varied that they are substantially equal to each other. Further, since the free end of the first displacement portion and the free end of the second displacement portion are connected to each other via the connection portion, the first displacement portion and the second displacement portion can be displaced in the direction of the third axis at substantially the same oscillation frequency. As a result, electrostatic capacitance created in the first displacement portion and electrostatic capacitance created in the second displacement portion are substantially equal to each other, whereby a physical quantity acting on the oscillator is detected with improved precision. An oscillator that allows detection of a physical quantity with improved precision can therefore be provided.

Application Example 7

In the oscillator according to the application example described above, it is preferable that the beam has an axis of rotation in the direction of the first axis, and that the rigidity of the connection portion in the direction of the third axis is higher than the rigidity thereof in the direction of the second axis and higher than the rigidity of the beam in the rotational direction.

According to this application example, the rigidity of the connection portion in the direction of the third axis is higher than the rigidity thereof in the direction of the second axis. The configuration prevents oscillation that causes the free end of the first displacement portion and the free end of the second displacement portion to be displaced around the beam in opposite directions, whereby the free ends can be displaced in the same direction.

Further, since the rigidity of the connection portion in the direction of the third axis is higher than the rigidity (spring constant) of the beam in the rotational direction, the rigidity of the beam in the rotational direction predominantly determines the natural oscillation frequencies of the first displacement portion and the second displacement portion, whereby the natural frequency of the first displacement portion and the natural frequency of the second displacement portion are allowed to be substantially equal to each other by oaring the spring constant of the beam. As a result, since the first displacement portion and the second displacement portion are displaced at substantially the same oscillation frequency, and the electrostatic capacitance created in the first displacement portion and the electrostatic capacitance created in the second displacement portion are substantially equal to each other, a physical quantity acting on the oscillator is detected with improved precision. An oscillator that allows detection of a physical quantity with improved precision can therefore be provided.

Application Example 8

An electronic apparatus according to this application example includes the oscillator according to the application example described above.

According to this application example, an electronic apparatus including an oscillator that allows detection of a physical quantity with high precision can be provided.

Application Example 9

A moving object according to this application example includes the oscillator according to the application example described above.

According to this application example, a moving object including an oscillator that allows detection of a physical quantity with high precision can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below with reference to the drawings. In the following figures, each layer and each member are drawn in scales different from actual scales in such a way that the layer and the member are drawn in recognizable sizes.

Oscillator

First Embodiment

An oscillator according to the present embodiment can be used, for example, as an inertial sensor. Specifically, the oscillator can be used as a sensor device for determining acceleration (electrostatic-capacitance-based acceleration sensor device), a sensor device for determining angular velocity (electrostatic-capacitance-based angular velocity sensor device), or any other sensor device. In the present embodiment, an oscillator for determining angular velocity will be described as an example.

Figure 1:
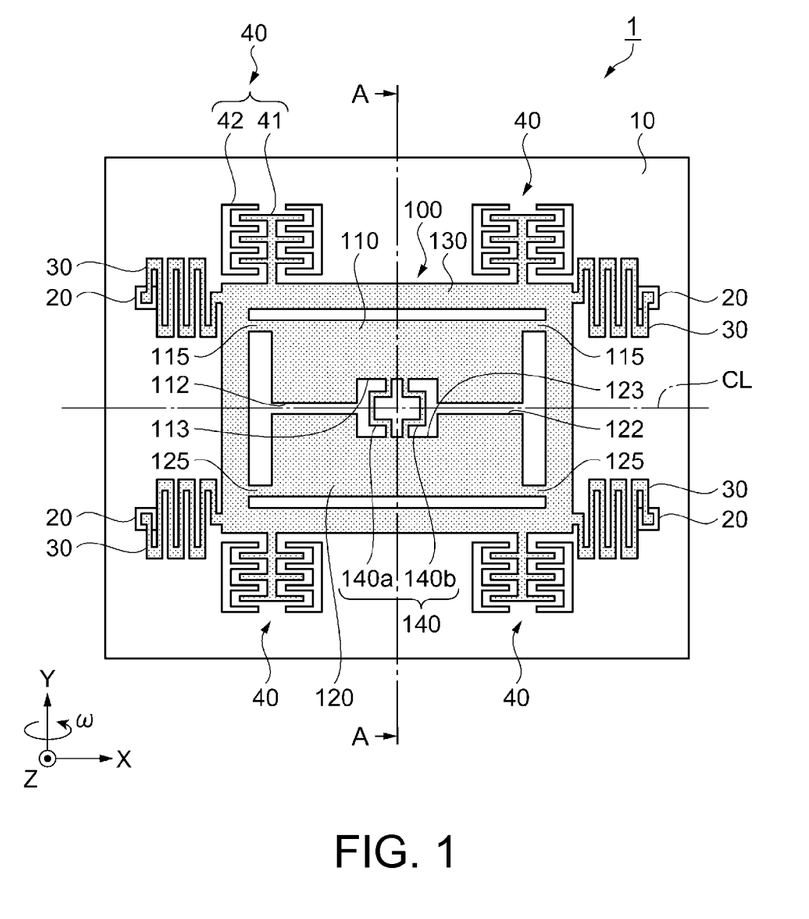
FIG. 1 is a diagrammatic plan view showing a schematic configuration of an oscillator according to a first embodiment.
Figure 2:
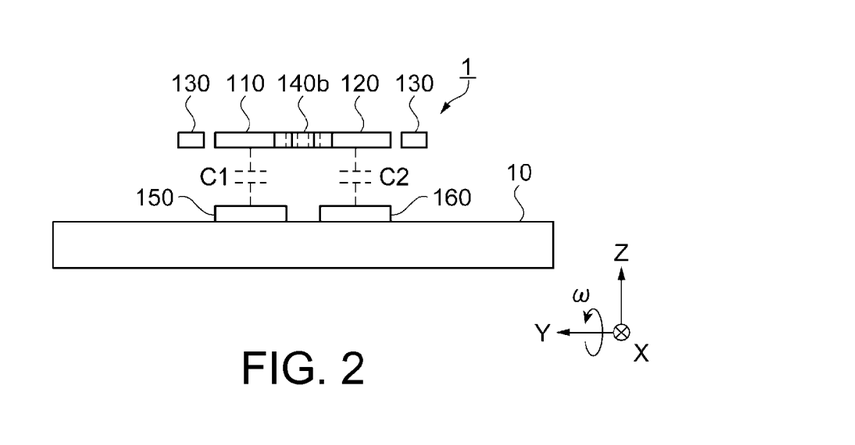
FIG. 2 is a cross-sectional view taken along the line A-A in FIG. 1.

FIG. 1 is a diagrammatic plan view showing a schematic configuration of an oscillator 1 according to the first embodiment. FIG. 2 is a cross-sectional view taken along the line A-A in FIG. 1. In FIGS. 1 and 2 and FIGS. 3 to 5, which will be described later, three axes perpendicular to each other are shown as an X axis (first axis), a Y axis (second axis), and a Z axis (third axis), and the front end side and the base end side of the arrow of each of the axes shown in the drawings are called a "positive (+) side" and a "negative (−) side," respectively, for ease of description. Further, in the following description, the direction parallel to the X axis is called an "X-axis direction," the direction parallel to the Y axis is called a "Y-axis direction," and the direction parallel to the Z axis is called a "Z-axis direction."

The schematic configuration of the oscillator 1 according to the first embodiment will first be described with reference to FIGS. 1 and 2.

The oscillator 1 is formed, for example, of a substrate 10, fixing portions 20, a first mass part 100, drivers 40, and elastic parts 30, as shown in FIGS. 1 and 2.

In a plan view in the +Z-axis direction, a pair of elastic parts 30, which are displaceable in the ±X-axis directions, are connected to each of the X-axis-direction side surfaces of the first mass part 100, two pairs in total, and a pair of drivers 40 (driving movable electrodes 41) are connected to each of the ±Y-axis-directions side surfaces of the first mass part 100, two pairs in total. The first mass part 100 is fixed to the fixing portions 20, which stand on the +Z-axis-side surface of the substrate 10, via the elastic parts 30.

The first mass part 100, the drivers 40, and the elastic parts 30 are primarily made of silicon (Si). The portions described above are formed integrally with each other by processing a silicon substrate with the aid of a variety of processing technologies (dry etching and other etching technologies, for example) to form a desired outer shape. Instead, after a silicon substrate and a glass substrate are bonded to each other, only the silicon substrate can be processed into a desired outer shape to form the portions described above. Use of silicon as a primary material achieves excellent oscillation characteristics and excellent durability. Further, use of silicon allows microscopic processing technologies used in silicon semiconductor device fabrication to be employed, whereby the size of the oscillator 1 can be reduced.

The substrate 10 is made primarily of silicon. The substrate 10 is not necessarily made of silicon and may instead be made, for example, of quartz or any of a variety of glass materials.

The substrate 10 has a plate-like shape, and the fixing portions 20 are bonded to the +Z-axis-side surface of the substrate 10. The first mass part 100, the drivers 40 (driving movable electrodes 41), and the elastic parts 30 are fixed to and supported by the fixing portions 20 with a gap provided on the +Z-axis side of the substrate 10. A method for bonding the substrate 10 and the elastic parts 30 to each other is not limited to a specific method, and the bonding may be performed by using direct bonding, anodic bonding, or any of other variety of bonding methods. The fixing portions 20 are not necessarily provided on the +Z-axis-side surface of the substrate 10 and may instead be provided on a member other than the substrate 10 (package, for example).

A first fixed electrode 150 and a second fixed electrode 160 are provided on the +Z-axis-side surface of the substrate 10.

The first fixed electrode 150 is provided in a region where the first fixed electrode 150 is covered with a first displacement portion 110, which will be described later, when the substrate 10 is viewed in the plan view in the +Z-axis direction.

The second fixed electrode 160 is provided in a region where the second fixed electrode 160 is covered with a second displacement portion 120, which will be described later, when the substrate 10 is viewed in the plan view in the +Z-axis direction.

The first fixed electrode 150 and the second fixed electrode 160 are made, for example, of platinum (Pt), aluminum (Al), molybdenum (Mo), chromium (Cr), titanium (Ti), nickel (Ni), copper (Cu), silver (Ag), gold (Au), or an alloy primarily containing any of the metals described above. Each of the first fixed electrode 150 and the second fixed electrode 160 is formed as follows: Any of the electrode materials described above is deposited on the substrate 10, which is made, for example, of silicon; and the outer shape of the electrode is then formed. The deposition of the electrode material is performed, for example, by using sputtering, and the patterning (outer shape formation) of the electrodes is performed, for example, by using photolithography and etching.

The elastic parts 30 connect the first mass part 100 and the fixing portions 20 to each other. Each of the elastic parts 30 has a shape extending in the X-axis direction while extending back and forth in the Y-axis direction. Further, each of the elastic parts 30 has a width in the Z-axis direction greater than the width in the X-axis direction. The thus shaped elastic parts 30 are hardly deformed in the Y-axis direction and the Z-axis direction but smoothly expand or contract in the X-axis direction. The elastic parts 30 may be shaped differently as long as each of the elastic parts 30 has a predetermined spring constant and is elastically deformed in the X-axis direction. Further, the elastic parts 30 have been described under the condition that a pair of elastic parts 30 are connected to each side surface of the first mass part 100 but are not necessarily configured this way. The elastic parts 30 may instead be configured differently as long as the elastic parts 30 can support the first mass part 100 and oscillate in the X-axis direction.

Each of the drivers 40 has a mechanism that excites oscillation of the first mass part 100 in the X-axis direction (first axis direction). Each of the drivers 40 is formed of a driving movable electrode 41, which is connected to a Y-axis-direction side surface of the first mass part 100, and a driving fixed electrode 42, which faces the driving movable electrode 41 with a predetermined distance therebetween. Instead, each of the drivers 40 may not be directly connected to the first mass part 100 but may have a mechanism that excites oscillation of the first mass part 100 based, for example, on electrostatic force and may be disposed in a position outside the first mass part 100.

The driving movable electrode 41 is a comb-shaped electrode having a stem portion that extends from the first mass part 100 in the +Y-axis direction or −Y-axis direction and a plurality of branches that extend from the stem portion in the +X-axis direction and the −X-axis direction.

The driving fixed electrode 42 is disposed in a portion outside the driving movable electrode 41. The driving fixed electrode 42 is bonded (fixed) to the +Z-axis-side surface of the substrate 10. The driving fixed electrode 42 has a comb-shaped electrode corresponding to the comb-shaped driving movable electrode 41, and the driving fixed electrode 42 and the driving movable electrode 41 are so disposed that they face each other.

The drivers 40 are electrically connected to a power source that is not shown. When voltages are applied to the driving movable electrode 41 and the driving fixed electrode 42 of each of the drivers 40, electrostatic force can be produced between the driving movable electrode 41 and the driving fixed electrode 42. When an AC voltage is applied to the drivers 40, the electrostatic force expands and contracts the elastic parts 30 in the X-axis direction, and the first mass part 100 repeatedly oscillates along the X-axis direction. The oscillating first mass part 100 allows the oscillator 1 to readily receive inertia resulting, for example, from angular velocity.

The configuration of the drivers 40 and the number of drivers 40 are not limited to specific ones as long as the drivers 40 can excite oscillation of the first mass part 100.

The configuration of the first mass part 100 will next be described.

The first mass part 100 is formed of a support 130, beams 115 and 125, a first displacement portion 110, a second displacement portion 120, a connection portion 140, and other portions. The first mass part 100 is so configured that the support 130 is formed along the outer circumference of the first mass part 100, and that the first displacement portion 110 and the second displacement portion 120 are surrounded by the support 130 in a plan view.

The first displacement portion 110 is connected rotatably around the X axis (first axis) to the support 130 via the beams 115, and the second displacement portion 120 is connected rotatably around the X axis to the support 130 via the beams 125. The first displacement portion 110 and the second displacement portion 120 are provided on an XY plane such that they have a line symmetric shape with respect to a center line CL, which halves the first mass part 100 in the Y-axis direction and is parallel to the X axis.

The beams 115 are so provided that they extend from +Y-axis-side portions of the X-axis-direction side surfaces of the first displacement portion 110, and the beams 125 are so provided that they extend from −Y-axis-side portions of the X-axis-direction side surfaces of the second displacement portion 120. One side of the first displacement portion 110 and one side of the second displacement portion 120 that face each other are therefore free ends 112 and 122. Therefore, when external force in the Z-axis direction acts on the oscillator 1, the free end 112 of the first displacement portion 110 and the free end 122 of the second displacement portion 120 can be displaced around the beams 115 and 125 in the Z-axis direction.

Electrostatic capacitance (variable electrostatic capacitance) C1 is created between the first displacement portion 110 and the first fixed electrode 150, and electrostatic capacitance (variable electrostatic capacitance) C2 is created between the second displacement portion 120 and the second fixed electrode 160.

When the first displacement portion 110 supported by the beams 115, which serve as a fulcrum, rotates around the X axis to displace the free end 112 in the Z-axis direction, the average distance between the first displacement portion 110 and the first fixed electrode 150 changes. Similarly, when the second displacement portion 120 supported by the beams 125, which serve as a fulcrum, rotates around the X axis to displace the free end 122 in the Z direction, the average distance between the second displacement portion 120 and the second fixed electrode 160 changes. Since the values of the electrostatic capacitance C1 and C2 change in accordance with the values of the displacement of the first displacement portion 110 and the second displacement portion 120, the oscillator 1 allows determination of acceleration (or angular velocity) acting on the oscillator 1 through detection of the values of the electrostatic capacitance C1 and C2.

The detection of angular velocity acting on the oscillator 1 will now be described as an example. When angular velocity ω around the +Y axis acts on the first mass part 100 oscillating along the X-axis direction, the free end 112 of the first displacement portion 110 and the free end 122 of the second displacement portion 120 are displaced around the beams 115 and 125 in the +Z-axis direction or the −Z-axis direction and then oscillate along the Z-axis direction.

When the free end 112 of the first displacement portion 110 and the free end 122 of the second displacement portion 120 are displaced around the beams 115 and 125 in the −Z-axis direction, the average distance between the first displacement portion 110 and the first fixed electrode 150 and the average distance between the second displacement portion 120 and the second fixed electrode 160 decrease, resulting in increases in the electrostatic capacitance C1 and C2.

The oscillator 1 allows determination of the angular velocity ω acting on the oscillator 1 around the Y axis through detection of the electrostatic capacitance C1 and the electrostatic capacitance C2 in the form of C1+C2.

The connection portion 140, which connects the first displacement portion 110 and the second displacement portion 120 to each other, will next be described.

The free end 112 of the first displacement portion 110 and the free end 122 of the second displacement portion 120 are connected to each other via the connection portion 140, which is flexible in the Y-axis direction (second axis direction). In the present embodiment, to provide a space that allows the connection of the connection portion 140, recesses 113 and 123, which are open in the Y-axis direction, are provided at central portions of the free end 112 of the first displacement portion 110 and the free end 122 of the second displacement portion 120. The first displacement portion 110 and the second displacement portion 120, specifically, the centers of the recesses 113 and 123 provided at the free ends 112 and 122, are connected to each other via the connection portion 140.

The connection portion 140 has connection points 140a and 140b and connects the first displacement portion 110 and the second displacement portion 120 to each other at the plurality of points. The connection point 140a has a shape that extends in the Y-axis direction while once extending back and force in the −X-axis direction, and the connection point 140b has a shape that extends in the Y-axis direction while once extending back and force in the +X-axis direction. The thus shaped connection points 140a and 140b are hardly deformed in the X-axis direction but are flexible in the Y-axis direction.

In the oscillator 1, since the first displacement portion 110 and the second displacement portion 120 are connected to each other via the connection portion 140, the free end 112 of the first displacement portion 110 and the free end 122 of the second displacement portion 120 can be displaced around the beams 115 and 125 in the Z-axis direction at substantially the same oscillation frequency.

Further, providing the free end 112 of the first displacement portion 110 and the free end 122 of the second displacement portion 120 with the recesses 113 and 123 increases the total area of the first displacement portion 110 and the second displacement portion 120. As a result, the changes in the electrostatic capacitance C1 and C2 created between the first displacement portion 110 and the first fixed electrode 150 and between the second displacement portion 120 and the second fixed electrode 160 can be increased.

Since the connection portion 140 has the plurality of connection points 140a and 140b, the rigidity of the connection portion 140 in the X-axis direction increases, whereby a situation in which the free ends 112 and 122 of the first and second displacement portions 110 and 120 are bent in the X-axis direction (first axis direction) is avoided.

The support 130 in the present embodiment has a shape that surrounds the outer circumference of the first displacement portion 110 and the second displacement portion 120 but is not necessarily shaped this way. Any other shape that can support the first displacement portion 110 and the second displacement portion 120 may be used.

As described above, the oscillator 1 according to the present embodiment can provide the following advantageous effects.

The oscillator 1 allows determination of angular velocity (or acceleration) acting on the first mass part 100 through detection of the electrostatic capacitance created when the angular velocity (or acceleration) displaces the first displacement portion 110 and the second displacement portion 120 around the beams 115 and 125 in the Z-axis direction.

Since the first displacement portion 110 and the second displacement portion 120, specifically, the free ends 112 and 122 facing each other are connected to each other via the connection portion 140, the first displacement portion 110 and the second displacement portion 120 can be displaced at substantially the same oscillation frequency even when there is a difference in natural oscillation frequency between the first displacement portion 110 and the second displacement portion 120. As a result, the electrostatic capacitance C1 between the first displacement portion 110 and the first fixed electrode 150 and the electrostatic capacitance C2 between the second displacement portion 120 and the second fixed electrode 160 are substantially equal to each other, whereby a physical quantity acting on the oscillator 1 can be detected at improved precision. An oscillator that allows detection of angular velocity (or acceleration) with improved precision can therefore be provided.

Second Embodiment

An oscillator according to the present embodiment can be used, for example, as an inertia sensor. An oscillator for determining angular velocity by using two mass parts will be described as an example.

Figure 3:
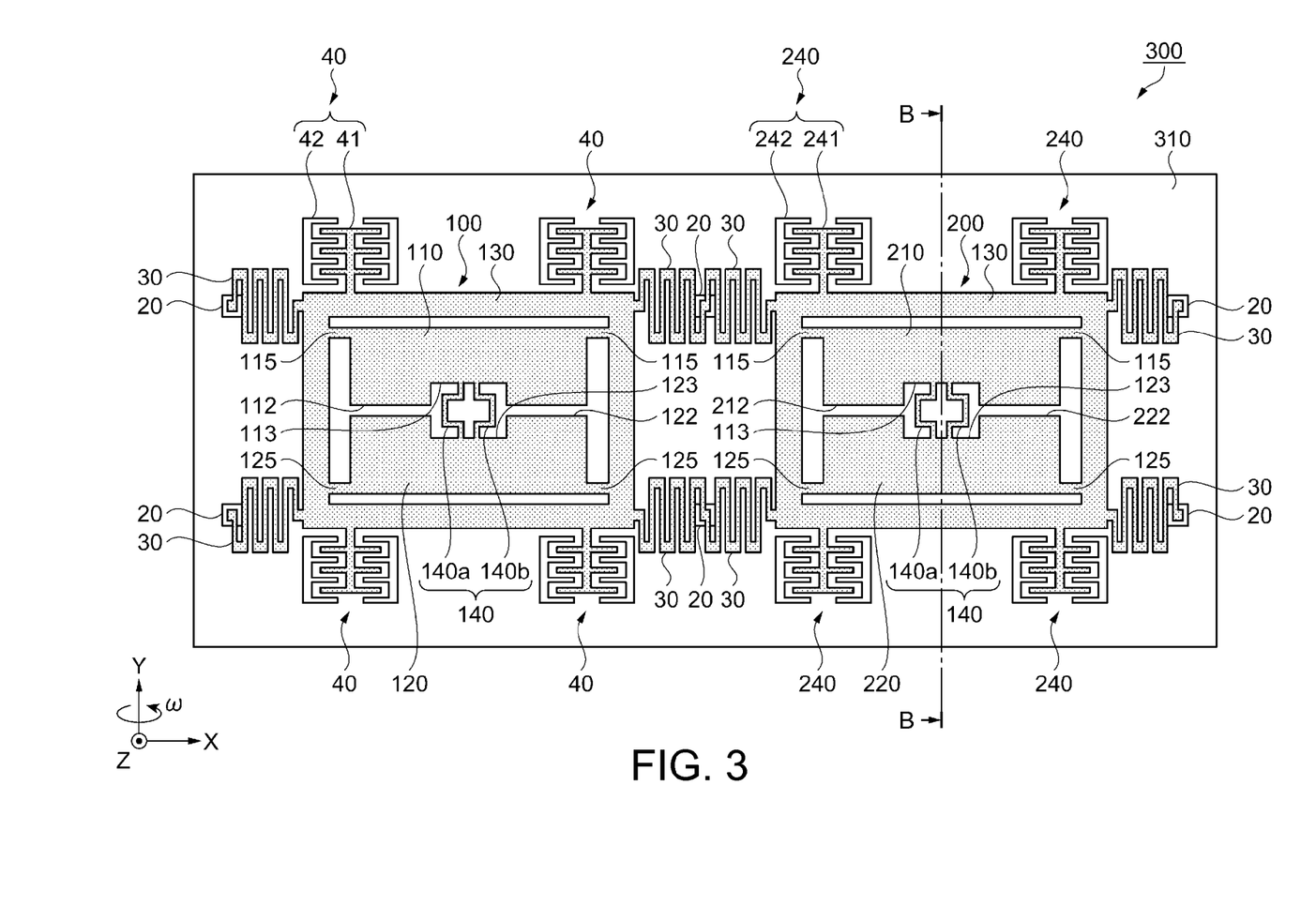
FIG. 3 is a diagrammatic plan view showing a schematic configuration of an oscillator according to a second embodiment.
Figure 4:
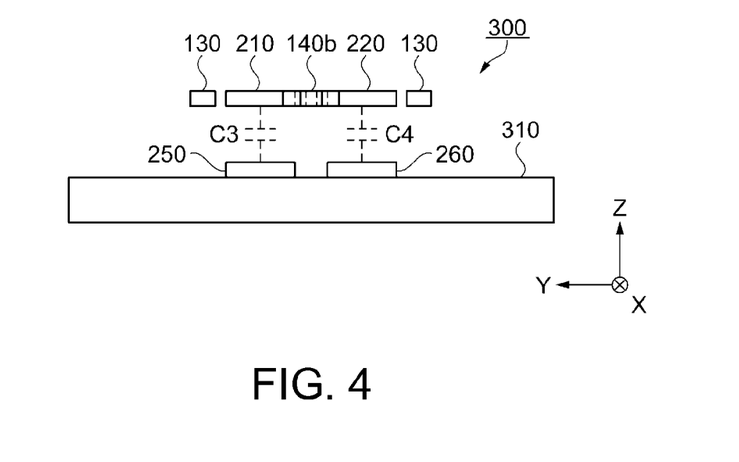
FIG. 4 is a cross-sectional view taken along the line B-B in FIG. 3.

FIG. 3 is a diagrammatic plan view showing a schematic configuration of an oscillator 300 according to the second embodiment. FIG. 4 is a cross-sectional view taken along the line B-B in FIG. 3.

The schematic configuration of the oscillator 300 according to the second embodiment will first be described with reference to FIGS. 3 and 4. The same configuration portions as those in the first embodiment have the same reference characters, and no redundant description will be made.

In the oscillator 300, the mass part described in the first embodiment (first mass part 100) is provided in two locations along the X-axis direction, and the two mass parts are disposed side by side and connected to each other, as shown in FIG. 3. The two mass parts have the same configuration, but are referred to as the first mass part 100 and a second mass part 200 for ease of description, and the two displacement portions that form the second mass part 200 are referred to as a third displacement portion 210 and a fourth displacement portion 220 in the description.

The oscillator 300 is formed, for example, of a substrate 310, the fixing portions 20, the first mass part 100, the second mass part 200, the drivers 40 and drivers 240, and the elastic parts 30.

In a plan view in the +Z-axis direction, a pair of elastic parts 30, which are displaceable in the ±X-axis directions, are connected to each of the X-axis-direction side surfaces of the second mass part 200, two pairs in total, and a pair of drivers 240 (driving movable electrodes 241) are connected to each of the ±Y-axis-direction side surface of the second mass part 200, two pairs in total. The first mass part 100 and the second mass part 200 are provided side by side along the X-axis direction and connected to each other via the elastic parts 30 that are connected to the first mass part 100 and the second mass part 200. The first mass part 100 and the second mass part 200 are fixed to the fixing portions 20, which stand on the +Z-axis-side surface of the substrate 310 via the elastic parts 30.

The first mass part 100, the second mass part 200, the drivers 40 and 240, and the elastic parts 30 are formed integrally with each other. The material of the portions described above and the method for processing them are the same as those in the first embodiment, and no detailed description thereof will be made.

The first fixed electrode 150 (not shown), the second fixed electrode 160 (not shown), a third fixed electrode 250, and a fourth fixed electrode 260 are provided on the +Z-axis-side surface of the substrate 310.

The third fixed electrode 250 is provided in a region where the third fixed electrode 250 is covered with the third displacement portion 210, which will be described later, when the substrate 310 is viewed in the plan view in the +Z-axis direction.

The fourth fixed electrode 260 is provided in a region where the fourth fixed electrode 260 is covered with the fourth displacement portion 220, which will be described later, when the substrate 310 is viewed in the plan view in the +Z-axis direction.

The material of the third fixed electrode 250 and the fourth fixed electrode 260 and the method for forming them are the same as the material of the first fixed electrode 150 and the second fixed electrode 160 and the method for forming them described in the first embodiment, and no detailed description of the material and the formation method will be made.

Each of the drivers 240 has a mechanism that excites oscillation of the second mass part 200 in the X-axis direction (first axis direction). Each of the drivers 240 is formed of a driving movable electrode 241 and a driving fixed electrode 242. The shape of the drivers 240 is the same as the shape of the drivers 40 described in the first embodiment, and no detailed description thereof will be made.

The drivers 240 are electrically connected to a power source that is not shown. When an AC voltage is applied to the driving movable electrode 241 and the driving fixed electrode 242 of each of the drivers 240, electrostatic force can be produced between the driving movable electrode 241 and the driving fixed electrode 242.

When AC voltages having phases different from each other by 180 degrees are applied to the drivers 40, which are connected to the first mass part 100, and the drivers 240, which are connected to the second mass part 200, the first mass part 100 and the second mass part 200 repeatedly oscillate in opposite directions along the X-axis direction.

The second mass part 200 is formed of the support 130, the beams 115 and 125, the third displacement portion 210, the fourth displacement portion 220, and the connection portion 140. A free end 212 of the third displacement portion supported by the beams 115, which serve as a fulcrum, is displaced in the Z-axis direction, and a free end 222 of the fourth displacement portion 220 supported by the beams 125, which serve as a fulcrum, is displaced in the Z-axis direction. The configuration of the second mass part 200 is the same as the configuration of the first mass part 100 described in the first embodiment and will not be described in detail.

Since the first mass part 100 and the second mass part 200 are provided independently of each other, the displacement of the first displacement portion 110 and the second displacement portion 120 in the Z-axis direction and the displacement of the third displacement portion 210 and the fourth displacement portion 220 in the Z-axis direction do not interfere with each other, whereby angular velocity around the Y axis acting on the oscillator 300 can be detected with improved precision.

Electrostatic capacitance (variable electrostatic capacitance) C3 is created between the third displacement portion 210 and the third fixed electrode 250, and electrostatic capacitance (variable electrostatic capacitance) C4 is created between the fourth displacement portion 220 and the fourth fixed electrode 260.

The mechanism in accordance with which the values of the electrostatic capacitance C3 and C4 change is the same as the mechanism in accordance with which the values of the electrostatic capacitance C1 and C2 change described in the first embodiment and will not be described in detail.

A description will next be made of detection of the electrostatic capacitance to determine angular velocity acting on the oscillator 300.

When angular velocity $\omega$ oriented clockwise in the +Y-axis direction acts on the oscillator 300 with the first mass part 100 and the second mass part 200 oscillating in opposite directions along the X-axis direction, the first mass part 100 receives force in the −Z-axis direction and the second mass part 200 receives force in the +Z-axis direction.

As a result, the free end 112 and the free end 122 of the first displacement portion 110 and the second displacement portion 120, which form the first mass part 100, are displaced around the beams 115 and 125 in the −Z-axis direction.

On the other hand, the free end 212 and the free end 222 of the third displacement portion 210 and the fourth displacement portion 220, which form the second mass part 200, are displaced around the beams 115 and 125 in the +Z-axis direction.

The first and second displacement portions 110, 120 and the third and fourth displacement portions 210, 220 then oscillate in opposite directions along the Z-axis direction.

When the free ends 112 and 122 of the first and second displacement portions 110 and 120 are displaced in the −Z-axis direction, the average distance between the first displacement portion 110 and the first fixed electrode 150 and the average distance between the second displacement portion 120 and the second fixed electrode 160 decrease, resulting in increases in the electrostatic capacitance C1 and C2.

When the free ends 212 and 222 of the third and fourth displacement portions 210 and 220 are displaced in the +Z-axis direction, the average distance between the third displacement portion 210 and the third fixed electrode 250 and the average distance between the fourth displacement portion 220 and the fourth fixed electrode 260 increase, resulting in decreases in the electrostatic capacitance C3 and C4.

The oscillator 300 therefore allows determination of the angular velocity $\omega$ acting on the oscillator 300 around the Y axis through detection of the electrostatic capacitance C1 to C4 in the form of $(C1+C2)-(C3+C4)$.

As described above, the oscillator 300 according to the present embodiment can provide the following advantageous effect in addition to the advantageous effect provided by the first embodiment.

The oscillator 300 includes the first mass part 100 and the second mass part 200. The first mass part 100 and the second mass part 200 are provided side by side along the X-axis direction and connected to each other via the elastic parts 30, which are displaceable in the X-axis direction, on the +Z-axis-side surface of the substrate 310. When angular velocity $\omega$ around the Y axis acts on the oscillator 300, the free ends 112 and 122 of the first displacement portion 110 and the second displacement portion 120 of the first mass part 100 are displaced around the beams 115 and 125 in the −Z-axis direction, resulting in increases in the electrostatic capacitance C1 and C2. On the other hand, the free ends 212 and 222 of the third displacement portion 210 and the fourth displacement portion 220 of the second mass part 200 are displaced around the beams 115 and 125 in the +Z-axis direction, resulting in decreases in the electrostatic capacitance C3 and C4. The angular velocity ω acting on the oscillator 300 around the Y axis can be determined by detecting the electrostatic capacitance C1 to C4 in the form of (C1+C2)−(C3+C4). Further, since the free end 112 of the first displacement portion 110 and the free end 122 of the second displacement portion 120 are connected to each other via the corresponding connection portion 140 and the free end 212 of the third displacement portion 210 and the free end 222 of the fourth displacement portion 220 are connected to each other via the corresponding connection portion 140, the electrostatic capacitance C1 and the electrostatic capacitance C2 are substantially equal to each other and the electrostatic capacitance C3 and the electrostatic capacitance C4 are substantially equal to each other, whereby the angular velocity ω acting on the oscillator 300 is detected with improved precision. The oscillator 300 provided in the present embodiment can therefore detect angular velocity with improved precision.

Variation

The invention is not limited to the embodiments described above, and a variety of changes, improvements, and other modifications can be made to the embodiments described above. A variation will be described below.

Figure 5:
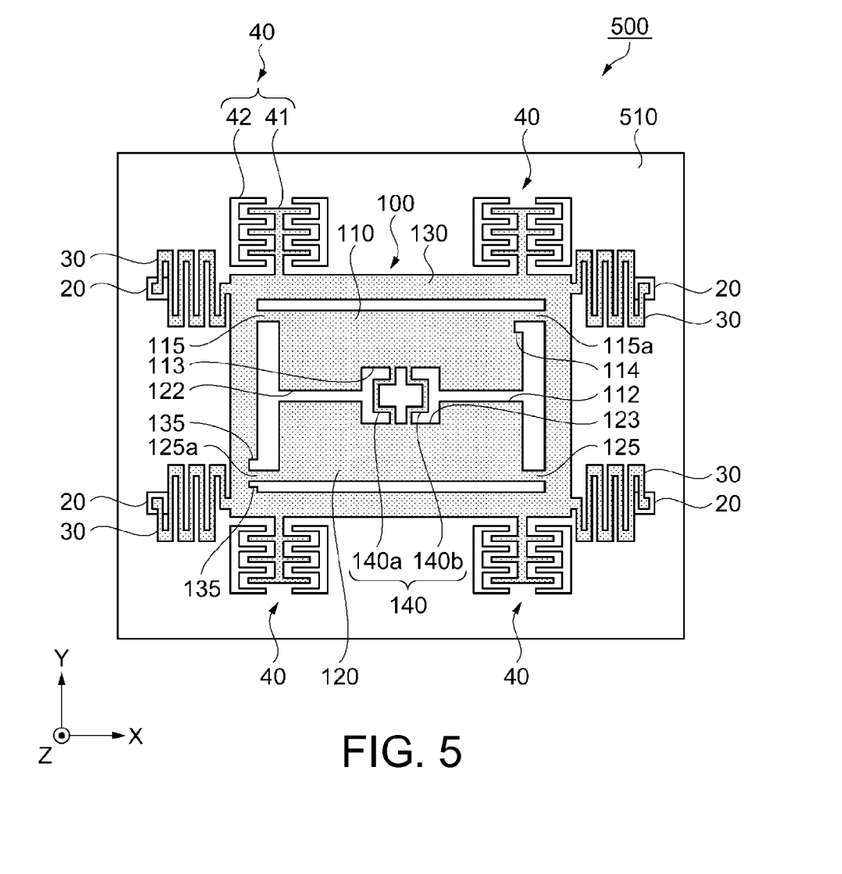
FIG. 5 is a diagrammatic plan view showing a schematic configuration of an oscillator according to a variation.

FIG. 5 is a diagrammatic plan view showing a schematic configuration of an oscillator 500 according to the variation.

The schematic configuration of the oscillator 500 according to the variation will first be described with reference to FIG. 5. The same configuration portions as those in the first embodiment have the same reference characters, and no redundant description will be made.

The oscillator 500 according to the variation differs from the oscillator 1 according to the first embodiment in that the first displacement portion 110 and the support 130 are provided with variable parts 114 and 135, which vary the natural oscillation frequencies of the first displacement portion 110 and the second displacement portion 120, the beam that connects the support 130 and the first displacement portion 110 to each other is a beam 115a, which differs from the beam 115 in terms of length, and the beam that connects the support 130 and the second displacement portion 120 to each other is a beam 125a, which differs from the beam 125 in terms of length.

The variable parts 114 and 135 will be described.

The first displacement portion 110 is provided with the variable part 114, which varies the length of the beam 115a, as shown in FIG. 5. Specifically, the variable part 114 is a portion produced by cutting or otherwise processing the +X-axis-direction side surface of the first displacement portion 110 in such a way that the length of the beam 115a in the X-axis direction is effectively increased. Since the processing operation performed on the first displacement portion 110 lowers the rigidity (spring constant) of the beam 115a in the rotational direction, the natural oscillation frequency of the first displacement portion 110 can be changed.

The support 130 is provided with the variable part 135, which varies the length of the beam 125a. Specifically, the variable part 135 is a portion produced by processing the −X-axis-direction inner side surface of the support 130 in such a way that the length of the beam 125a in the X-axis direction is effectively increased. Since the processing operation performed on the support 130 lowers the rigidity (spring constant) of the beam 125a in the rotational direction, the natural oscillation frequency of the second displacement portion 120 can be changed.

Therefore, providing the variable part 114 or the variable part 135 in at least one of the first displacement portion 110, the second displacement portion 120, and the support 130 allows the natural oscillation frequency of the first displacement portion 110 and the natural oscillation frequency of the second displacement portion 120 to approach each other.

The positions of the variable parts 114 and 135, the shapes thereof, and the number thereof described above are presented by way of example and are not necessarily employed.

The connection portion 140 will next be described.

The connection portion 140 connects the free end 112 of the first displacement portion 110 and the free end 122 of the second displacement portion 120 to each other. Since the rigidity of the connection portion 140 in the Z-axis direction is higher than the rigidity (spring constant) of the beams 115 and 125 in the rotational direction, the rigidity of the beams in the rotational direction predominantly determines the natural oscillation frequencies of the first displacement portion 110 and the second displacement portion 120. Since the first displacement portion 110 is provided with the variable part 114, which lowers the rigidity of the beam 115a in the rotational direction, and the support 130 is provided with the variable part 135, which lowers the rigidity of the beam 125a in the rotational direction, the natural oscillation frequencies of the first displacement portion 110 and the second displacement portion 120 can be readily changed.

Further, the rigidity of the connection portion 140 in the Z-axis direction (kz) is higher than the rigidity thereof in the Y-axis direction (ky) (ky<kz). The configuration prevents oscillation that causes the free end 112 of the first displacement portion 110 and the free end 122 of the second displacement portion 120 to be displaced in opposite directions, whereby the free ends can be displaced in the same direction at the same oscillation frequency. As a result, the electrostatic capacitance C1 created between the first displacement portion 110 and the first fixed electrode 150 and the electrostatic capacitance C2 created between the second displacement portion 120 and the second fixed electrode 160 can be substantially equal to each other (see FIG. 2).

As described above, the oscillator 500 according to the present variation can provide the following advantageous effect in addition to the advantageous effect provided by the first embodiment.

The oscillator 500 is provided with the variable parts 114 and 135, which vary the natural oscillation frequency of at least one of the first displacement portion 110 and the second displacement portion 120. Further, the free end 112 of the first displacement portion 110 and the free end 122 of the second displacement portion 120 are connected to each other via the connection portion 140. Since the rigidity of the connection portion 140 in the Y-axis direction (ky) is higher than the rigidity of the beams 115 and 125 in the rotational direction (kθ) (kθ<ky), the rigidity of the beams 115 and 125 in the rotational direction predominantly determines the natural oscillation frequencies of the first displacement portion 110 and the second displacement portion 120, whereby the natural frequencies of the two displacement portions are readily allowed to approach each other by the changes provided by the variable parts 114 and 135. Further, since the rigidity of the connection portion 140 in the Z-axis direction is higher than the rigidity thereof in the Y-axis direction (ky<kz), the free end 112 of the first displacement portion 110 and the free end 122 of the second displacement portion 120 can be displaced in the same direction (ky<kθ<kz). As a result, since the first displacement portion 110 and the second displacement portion 120 can be displaced in substantially the same direction at substantially the same oscillation frequency, and the electrostatic capacitance C1 and the electrostatic capacitance C2 created by the displacement are allowed to be substantially equal to each other, a physical quantity acting on the oscillator 500 can be detected with improved precision. An oscillator that allows detection of a physical quantity with improved precision can therefore be provided.

Electronic Apparatus

An electronic apparatus including the oscillator according to any of the embodiments of the invention will next be described with reference to FIGS. 6 to 8. In the present description, an example in which the oscillator 1 is used is presented.

Figure 6:
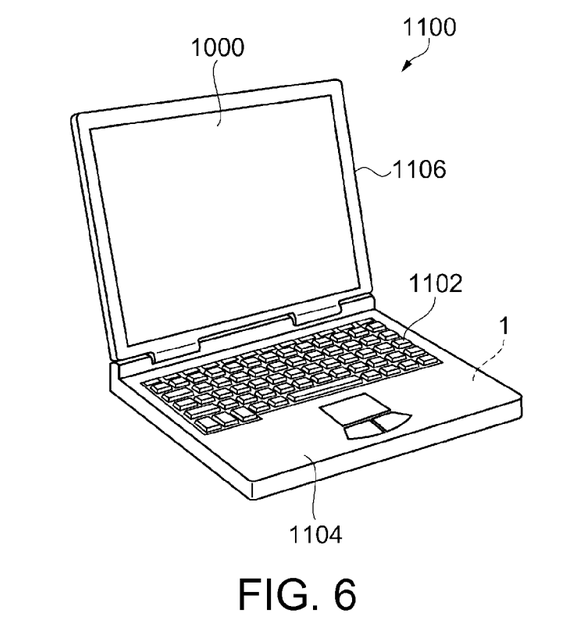
FIG. 6 is a perspective view showing the configuration of a mobile (or notebook) personal computer as an electronic apparatus including the oscillator.

FIG. 6 is a perspective view schematically showing the configuration of a mobile (or notebook) personal computer 1100 as an example of the electronic apparatus according to an embodiment of the invention including the oscillator 1. As shown in FIG. 6, the personal computer 1100 is formed of the following components: a body 1104 including a keyboard 1102; and a display unit 1106 including a display section 1000, and the display unit 1106 is pivotally supported by the body 1104 via a hinge structure. The thus configured personal computer 1100 accommodates the oscillator 1 having the function of determining acceleration or angular velocity.

Figure 7:
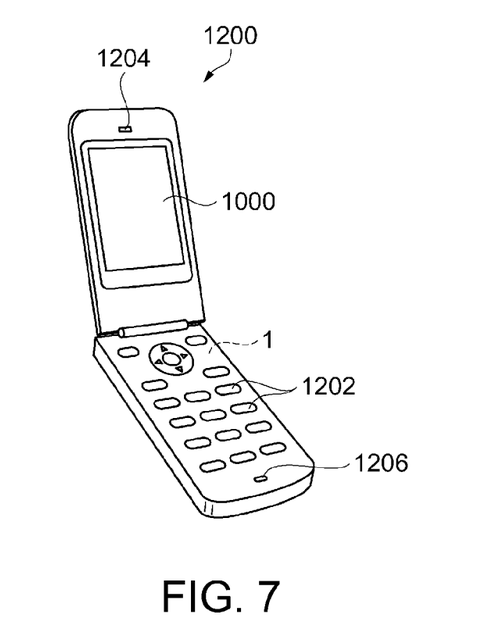
FIG. 7 is a perspective view showing a mobile phone as an electronic apparatus including the oscillator.

FIG. 7 is a perspective view schematically showing the configuration of a mobile phone 1200 (including PHS) as an example of the electronic apparatus according to an embodiment of the invention including the oscillator 1. As shown in FIG. 7, the mobile phone 1200 includes a plurality of operation buttons 1202, a receiver 1204, and a transmitter 1206, and a display section 1000 is disposed between the operation buttons 1202 and the receiver 1204. The thus configured mobile phone 1200 accommodates the oscillator 1 having the function of determining acceleration or angular velocity.

Figure 8:
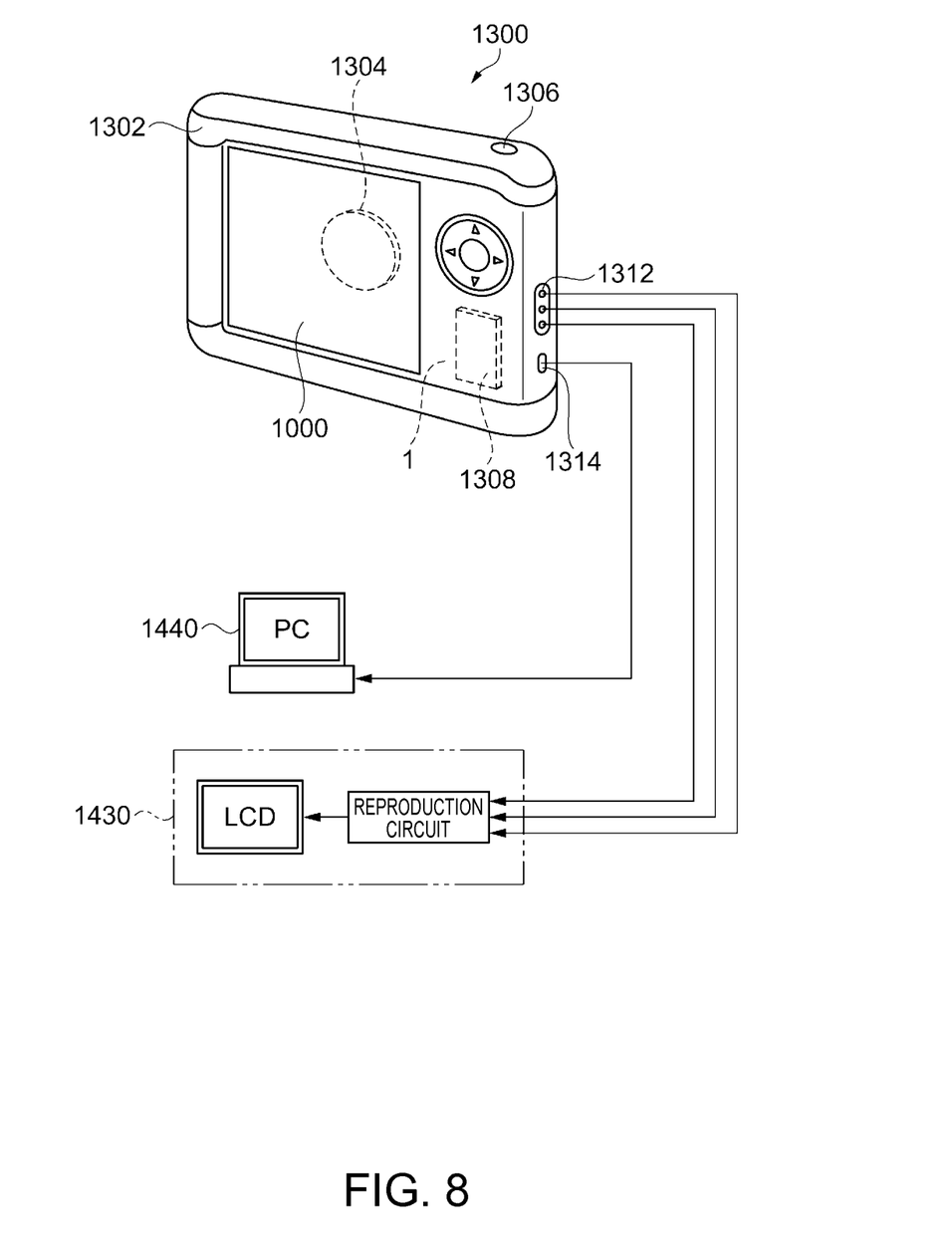
FIG. 8 is a perspective view showing a digital camera as an electronic apparatus including the oscillator.

FIG. 8 is a perspective view schematically showing the configuration of a digital camera 1300 as an example of the electronic apparatus according to an embodiment of the invention including the oscillator 1. FIG. 8 also shows connection to an external apparatus in a simplified manner. In a film camera of related art, a silver photographic film is exposed to light, specifically to an optical image of a subject, whereas the digital camera 1300 converts an optical image of a subject into a captured image signal (image signal) in a photoelectric conversion process by using a CCD (charge coupled device) or any other imaging device.

A display section 1000 is provided on the rear side of a case (body) 1302 of the digital camera 1300 and displays an image based on the captured image signal from the CCD. The display section 1000 thus functions as a finder that displays a subject in the form of an electronic image. Further, alight receiving unit 1304 including an optical lens (imaging system), the CCD, and other components is provided on the front side (rear side in FIG. 8) of the case 1302.

When a user of the camera checks a subject image displayed on the display section 1000 and presses a shutter button 1306, a captured image signal from the CCD at that point of time is transferred to and stored in a memory 1308. Further, in the digital camera 1300, a video signal output terminal 1312 and a data communication input/output terminal 1314 are provided on a side surface of the case 1302. A television monitor 1430 is connected to the video signal output terminal 1312 as necessary, and a personal computer 1440 is connected to the data communication input/output terminal 1314 as necessary, as shown in FIG. 8. Further, in response to predetermined operation, a captured image signal stored in the memory 1308 is outputted to the television monitor 1430 or the personal computer 1440. The thus configured digital camera 1300 accommodates the oscillator 1 as, for example, an angular velocity sensor.

The oscillator 1 according to any of the embodiments of the invention is used not only in the personal computer 1100 (mobile personal computer) shown in FIG. 6, the mobile phone 1200 shown in FIG. 7, and the digital camera 1300 shown in FIG. 8 but also, for example in a variety of electronic apparatus, such as an inkjet-type liquid ejection apparatus (inkjet printer, for example), a laptop personal computer, a television receiver, a video camcorder, a video tape recorder, a car navigation system, a pager, an electronic notepad (including electronic notepad having communication capability), an electronic dictionary, a desktop calculator, an electronic game console, a word processor, a workstation, a TV phone, a security television monitor, electronic binoculars, a POS terminal, a medical apparatus (such as electronic thermometer, blood pressure gauge, blood sugar meter, electrocardiograph, ultrasonic diagnostic apparatus, and electronic endoscope), a fish finder, a variety of measuring apparatus, a variety of instruments (such as instruments in vehicles, airplanes, and ships), and a flight simulator.

Moving Object

A moving object including the oscillator according to any of the embodiments of the invention will next be described with reference to FIG. 9. In the present description, an example in which the oscillator 1 is used is presented.

Figure 9:
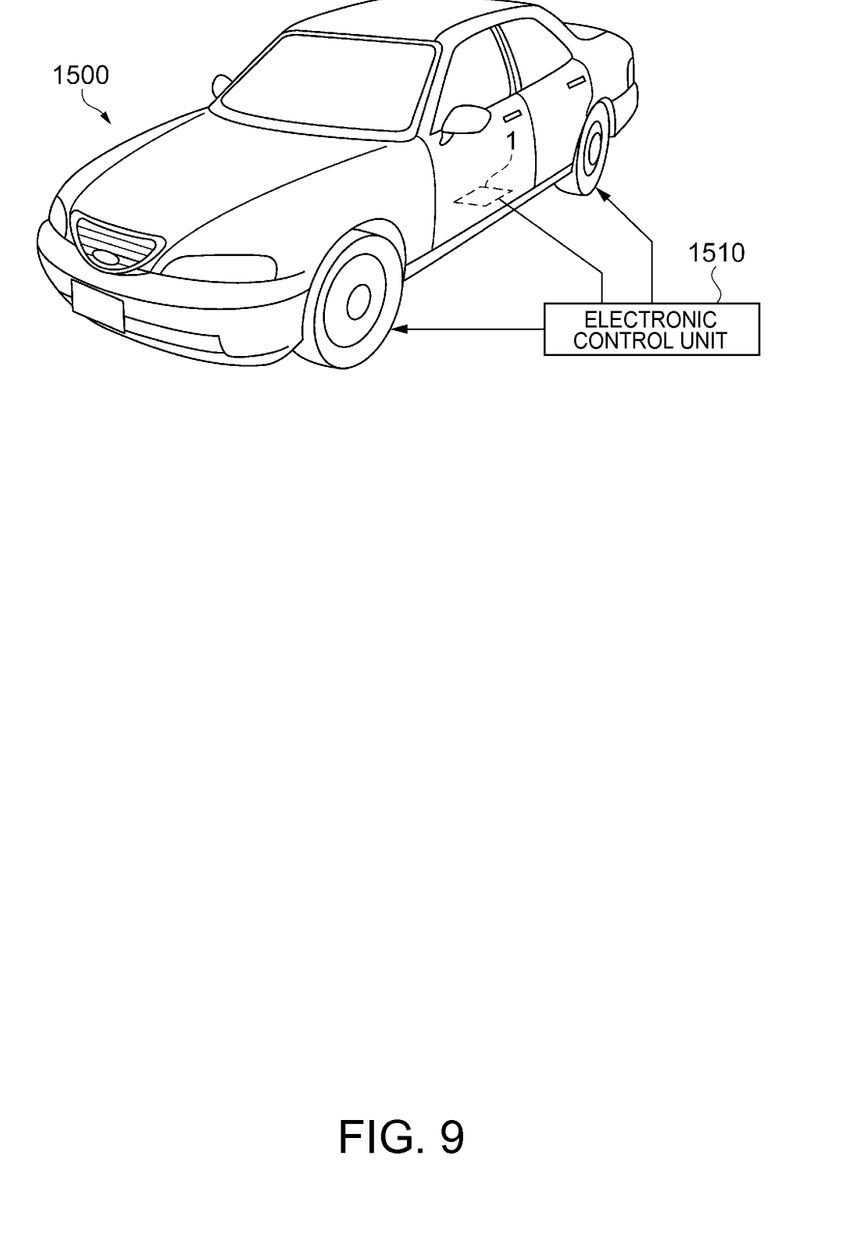
FIG. 9 is a perspective view showing an automobile as a moving object including the oscillator.

FIG. 9 is a perspective view schematically showing an automobile as an example of a moving object according to an embodiment of the invention including the oscillator 1.

An automobile 1500 has the oscillator 1 according to any of the embodiments incorporated therein. The automobile 1500 as a moving object accommodates an electronic control unit 1510, which accommodates the oscillator 1 and controls the wheels or any other part, in a vehicle body, as shown in FIG. 9. In addition, the oscillator 1 can be widely used as a keyless entry system, an immobilizer, a car navigation system, a car air conditioner, an antilock brake system (ABS), an airbag, a tire pressure monitoring system (TPMS), an engine control system, an apparatus that monitors a battery in a hybrid automobile and an electric automobile, a vehicle body attitude control system, and other electronic control units (ECUs).

What is claimed is:

1. A vibrating element having a first axis and a second axis perpendicular to each other and a third axis perpendicular to a plane containing the first axis and the second axis, the vibrating element comprising:
 a mass including:
  a support;
  a first displacement portion that is connected rotatably around the first axis to the support via a first beam and that extends on the plane containing the first axis and the second axis; and
  a second displacement portion that is connected rotatably around the first axis to the support via a second beam and that extends on the plane containing the first axis and the second axis, wherein the first displacement portion is provided on one side of the mass and the second displacement portion is provided on the other side of the mass, and free ends of the first displacement portion and the second displacement portion face each other and are connected to each other via a connection portion, and wherein a variable part that varies a natural oscillation frequency of one of the first displacement portion or the second displacement portion is provided in one of the support, the first displacement portion, or the second displacement portion, to which on e of the first beam or the second beam is connected.

2. The vibrating element according to claim 1, wherein the mass is formed of a first mass part and a second mass part, and the first mass part and the second mass part are connected to each other via an elastic part that is displaceable in a first direction along the first axis.

3. An electronic apparatus comprising:
the vibrating element according to claim 2; and
a housing that has a display,
wherein the vibrating element is located inside of the housing.

4. A moving object comprising:
the vibrating element according to claim 2; and
a movable body,
wherein the vibrating element is located inside of the movable body.

5. The vibrating element according to claim 1,
wherein the connection portion is flexible in a second direction along the second axis.

6. An electronic apparatus comprising:
the vibrating element according to claim 5; and
a housing that has a display,
wherein the vibrating element is located inside of the housing.

7. A moving object comprising:
the vibrating element according to claim 5; and
wherein the vibrating element is located inside of the movable body.

8. The vibrating element according to claim 1,
wherein the connection portion has a plurality of connection points in one of the first displacement portion or the second displacement portion.

9. An electronic apparatus comprising:
the vibrating element according to claim 8; and
a housing that has a display,
wherein the vibrating element is located inside of the housing.

10. A moving object comprising:
the vibrating element according to claim 8; and
a movable body,
wherein the vibrating element is located inside of the movable body.

11. The vibrating element according to claim 1,
wherein each of the free end of the first displacement portion and the free end of the second displacement portion is provided with a recess that is open in the second direction, and
the connection portion is connected to the recesses.

12. An electronic apparatus comprising:
the vibrating element according to claim 11; and
a housing that has a display,
wherein the vibrating element is located inside of the housing.

13. A moving object comprising:
the vibrating element according to claim 11; and
a movable body,
wherein the vibrating element is located inside of the movable body.

14. The vibrating element according to claim 1,
wherein the first and second beams have a rotation axis in the first direction, and
rigidity of the connection portion in of a third direction along the third axis is higher than the rigidity thereof in the second direction and higher than rigidity of the first and second beams in a rotational direction of the first and second displacement portions with respect to the first axis.

15. An electronic apparatus comprising:
the vibrating element according to claim 1; and
a housing that has a display,
wherein the vibrating element is located inside of the housing.

16. A moving object comprising:
the vibrating element according to claim 1; and
a movable body,
wherein the vibrating element is located inside of the movable body.

* * * * *